United States Patent
Hobbs et al.

(10) Patent No.: US 9,145,304 B2
(45) Date of Patent: Sep. 29, 2015

(54) SYNTHESIS OF NANOSIZED SODIUM TITANATES

(71) Applicant: Savannah River Nuclear Solutions, LLC, Aiken, SC (US)

(72) Inventors: David T. Hobbs, North Augusta, SC (US); Kathryn M. L. Taylor-Pashow, Aiken, SC (US); Mark C. Elvington, Fort Worth, TX (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 146 days.

(21) Appl. No.: 14/020,504

(22) Filed: Sep. 6, 2013

(65) Prior Publication Data

US 2014/0072804 A1    Mar. 13, 2014

Related U.S. Application Data

(60) Provisional application No. 61/697,827, filed on Sep. 7, 2012.

(51) Int. Cl.
  C01D 1/02    (2006.01)
  C01G 23/00   (2006.01)

(52) U.S. Cl.
  CPC .............. *C01D 1/02* (2013.01); *C01G 23/005* (2013.01); *Y10T 428/2982* (2015.01)

(58) Field of Classification Search
  CPC ... C01D 1/02; C01G 23/005; Y10T 428/2982
  USPC .......................................... 428/402; 423/598
  See application file for complete search history.

(56) References Cited

U.S. PATENT DOCUMENTS

| | | | | |
|---|---|---|---|---|
| 7,494,640 | B1 * | 2/2009 | Nyman et al. | 423/598 |
| 8,580,226 | B2 * | 11/2013 | Knoll et al. | 423/598 |
| 8,771,750 | B2 * | 7/2014 | Hobbs et al. | 424/617 |
| 2003/0035772 | A1 * | 2/2003 | Sylvester | 424/1.11 |

OTHER PUBLICATIONS

Bonino, R.; Damin, A.; Ricchiardi, G.; Ricci, M.; Spano, G.; D'Aidisio, R.; Zecehina, A.; Lamberti, C.; Prestipino, C.; Bordiga, S. (2004) Ti-Peroxo Species in the TS-1/$H_2O_2$/$H_2O$ System *J. Phys. Chem. B. 108*, 3573-3583.

Bordiga S.; Damm, A.; Bonino, F.; Ricelitardt, G.; Zacchiria, A.; Tagliapietra, R.; Lanberti, C. (2003) Resonance Raman effects in TS-1: the structure of Ti(IV) species and reactivity towards $H_2O_3NH_3$ and $H_2O_2$: an in situ study *Phys. Chem, Chem. Phys. 5*, 4390-4393.
Bouras, P.; Stathatos, E.; Lianos, P. (2007) Pure versus rneta-ion-doped nanocrystalline titania for photocatalysis *Applied Catalysis B: Environmental 73*, 51-59.
Chen, W.; Guo, X.; Zhang, S.; Jin.Z. (2007) TEM study on the formation mechanism of sodium titanate nanotubes *J. Nanoparticle Res. 9*, 1173-1180.
Chung, W.O., Wataha, J., Hobbs, D.T., An J.Y., Wong, J. J., Park, C., Elvington, M.C., Rutherford, R.B. (2011) Peroxotitanate—and monosodium metal-titanate compounds as inhibitors of bacterial growth *J. Biomed. Mater. Res. Part A.* 97, 348-354.
Dosch, R. G. (1978) *Use of Titanates in Decontamination of Defense Waste*; Report. RS-8232-2/50318; Sandia National Laboratories: Albuquerque, NM.
Duff, M,C.; Hunter, D.B.; Hobbs, D.T.; Fink, S.D.; Dai, Z.; Bradley, J.P. (2004) Mechanisms of strontium and uranium removal from high-level radioactive waste simulant solutions by the sorbent monosodium titanate, *Environ. Sci. Technol.*, 38, 5201-5207.
Elvington, M.C.; Click, D.R.; Hobbs, D.T. (2010) Sorption behavior of monosodium titanate and amorphous peroxotitanate materials under weakly acidic conditions *Sep. Sci. Technol.* 45, 66-72.
Fan, X.; Wang, Y.; Chen, X.; Gao, L.; Luo, W.; Yuan, Y.; Li, Z.; Yu, T.; Zhu, J.; Zou, Z. (2010) Facile method to synthesize mesoporous multimetal oxides ($ATiO_3$, A = Sr, Ba) with large specific surface areas and crystalline pore walls *Chem. Mater. 22*, 1276-1278.
Frank, A. J.; Kopidakis, N.; van de Lagemaat, J. (2004) Electrons in nanostructured $TiO_2$ solar cells: transport, recombination and photovoltaic properties *Coordination Chemistry Reviews 248*, 1165-1179.
Hobbs, D. T.; Barnes, M.J. Pulmano, R. L.; Marshal, K.M.; Edwards, T.B.; Bronkowski, M.G.; Fink, S. D. (2005) Strontium and actinide separations from high level nuclear waste solutions using monosodium titanate 1. simulant testing *Sep Sci. Technol. 40*, 3093-3111.
Hobbs, D. T.; Messer, R. L. W.; Lewis, J. B.; Click, D. R.; Lockwood, P. E.; Wataha, J.C. (2006) Adsorptionof Biometals to Monosodium Titanate in Biological Environments, *J. Biomed. Matls. Res. Part B: Appl. Biomatls.* 78(2), 296-301.

(Continued)

*Primary Examiner* — Leszek Kiliman
(74) *Attorney, Agent, or Firm* — Dority & Manning, P.A.

(57) ABSTRACT

Methods directed to the synthesis and peroxide-modification of nanosized monosodium titanate are described. Methods include combination of reactants at a low concentration to a solution including a nonionic surfactant. The nanosized monosodium titanate can exhibit high selectivity for sorbing various metallic ions.

17 Claims, 9 Drawing Sheets

(56) References Cited

OTHER PUBLICATIONS

Jiang, C.; Ichihara, M.; Honmaa, I.; Zhou, (2007) H. Effect of particle dispersion on high rate performance of nano-sized $Li_4Ti_5O_{12}$ anode *Electrochimica Acta 52*, 6470-6475.

Lehto, J.; Brodkin, L.; Harjula, R.; Tusa, E. (1999) Separation of radioactive strontium from alkaline nuclear waste solutions with the highly effective ion exchanger SrTreat *Nuclear Technology* 127, 81-87.

Lehto, J.; Harjula, R. (1999) Selective separation of radionuclides from nuclear waste solutions with inorganic ion exchangers *Radioactive. Acta* 86, 65-70.

Manna, B.; Dasgupta, M.; Ghosh, U. C. (2004) Crystalline hydrous titanium (IV) oxide (CHTO): An arsenic (III) scavenger from natural water *J Water Supply: Res. Technol.-AQUA. 53*, 483-495.

Menga, X.; Wanga, D.; Liua, J.; Zhang, S. (2004) Preparation and characterization of sodium titanate nanowires from brookite nanocrystallites *Mat. Res. Bul. 39* 2163-2170.

Mor, Gopal K.; Varghese, Oomman K.; Paulose, Maggie; Shankar, Karthik; Grimes, Craig A. (2006) A review on highly ordered, vertically oriented TiO2 nanotube arrays: Fabrication, material properties, and solar energy applications, *Solar Energy Materials & Solar Cells 90*, 2011-2075.

Nyman, M.; Hobbs, D.T. (2006) A family of peroxo-titanate materials tailored for optimal strontium and actinide sorption *Chem. Mater. 18*, 6425-6435.

O'Regan, B.; Grätzel, M. (1991) A low-cost, high-efficiency solar cell based on dye-sensitized colloidal $TiO_2$ films *Nature 353*, 737-740.

Peters, T. B.; Barnes, M.J.; Hobbs, D.T.; Walker, D.D.; Fondeur, F.F.; Norato, M.A.; Fink, S.D. (2006) Strontium and actinide separations from high level nuclear waste solutions using monosodium titanate 2. actual waste testing *Separation Science and Technology* 41(11), 2409-2427.

Puangpetch, T.; Sreethawong, T.; Chavadej, S. (2010) Hydrogen production over metal-loaded mesoporous-assembled $SrTiO_3$ nanocrystal photocatalysts: Effects of metal type and loading *International Journal of Hydrogen Energy 35*, 6531-6540.

Ramirez-Salgado, J.; Djurado, E.; Fabry, P. (2004) Synthesis of sodium titanate composites by sol-gel method for use in gas potentiometric sensors *J European Ceramic Society* 24, 2477-2483.

Rossmanith, R.; Weiss, C. K.; Geserick, J.; Husing, N.; Hormann, U.; Kaiser, U.; Landfester, K. (2008) Porous anatase nanoparticles with high specific area prepared by miniemulsion technique *Chem. Mater. 20*, 5768-6780.

Stewart, T.A.; Nyman, M.; deBoer, M.P. (2011) Delaminated titanate and peroxotitanate photocatalysts *Applied Catalysis B: Environmental 105*, 69-76.

Sylvester, P.; Clearfield, A. (1999) The removal of strontium from simulated Hanford tank wastes containing complexants *Sep. Sci. Technol. 34*, 2539-2551.

Vacque, V.; Sombret, B.; Huvenne, J.P.; Legrand, P.; Sue, S. (1997) Characterization of the O-O peroxide bond by vibrational spectroscopy *Spectrochimica Acta Part A* 53, 55-66.

Wataha, J.C.; Hobbs, D.T.; Wong, J.J.; Dogan, S.; Zhang, H.; Chung, K.-H.; Elvington, M.C. (2010) Titanates deliver metal ions to human monocytes *J. Materials Science: Materials in Medicine 21*, 1289-1295.

Wu, Y.; Zhang, Y.; Xu, J.; Chen, M.; Wu, L. (2010) One-step preparation of $PS/TiO_2$ nanocomposite particles via miniemulsion polymerization *Journal of Colloid and Interface Science 343*, 18-24.

Yada, M.; Goto, Y.; Uota, M.; Torikai, T.; Watari, T. (2006) Layered sodium titanate nanofiber and microsphere synthesized from peroxotitanic acid solution *J. Eur. Ceram. Soc. 26*, 673-678.

Yang, J.; Jin, Z.; Wang, X.; Li, W.; Zhang, J.; Zhang, S.; Guo, X.; Zhang, Z. (2003) Study on composition, structure and formation process of nanotube $Na_2Ti_2O_4(OH)_2$ *Dalton Trans.* 20, 3898-3901.

\* cited by examiner

SYNTHESIS OF NANOSIZED SODIUM TITANATES

CROSS REFERENCE TO RELATED APPLICATION

This application claims filing benefit of U.S. Provisional Application Ser. No. 61/697,827 having a filing date of Sep. 7, 2012, the entirety of which is incorporated herein by reference.

STATEMENT AS TO RIGHTS TO INVENTIONS MADE UNDER FEDERALLY SPONSORED RESEARCH

This invention was made with Government support under Contract No. DE-AC09-08SR22470 awarded by the United States Department of Energy and under Grant #1R01DE021373-01 awarded by the National Institute of Health. The Government has certain rights in the invention.

BACKGROUND

Titanium dioxide and alkali metal titanates find widespread use in a variety of applications such as pigments in paint and skin care products and as photocatalysts in energy conversion and utilization. Sodium titanates can also serve as cation exchangers and have been shown to be effective materials to remove a range of cations over a wide range of pH conditions. Given the inorganic framework, sodium titanates (e.g., monosodium titanate) can withstand high radiation doses and, thus, are attractive ion exchangers to remove $^{90}$Sr and alpha-emitting radionuclides (e.g., $^{238,239}$Pu, $^{237}$Np, $^{235, 238}$U) from high-activity nuclear waste solutions. Conversion of the sodium titanates to a peroxo-titanate form has been shown to increase the rate of strontium and plutonium removal, presumably by increasing the surface area and porosity.

In addition to ion exchange and photocatalytic applications, micron-sized sodium titanates and sodium peroxotitanates have been shown to serve as a therapeutic metal delivery platform. In this application, the sodium ions of monosodium titanate are exchanged for therapeutic metal ions such as Au(III), Au(I), and Pt(II). In vitro tests with the noble metal-exchanged titanates indicate suppression of the growth of cancer and bacterial cells by an unknown mechanism.

Historically, sodium titanates have been produced as fine powders, with particle sizes ranging from a few to several hundred microns using both sol-gel and hydrothermal synthetic techniques. More recently, synthetic methods have been reported that produced nanosized titanium dioxide, metal-doped titanium oxides and multi-metal titanates. Examples include sodium titanium oxide nanotubes and nanowires formed by reaction of titanium dioxide in excess sodium hydroxide at elevated temperature and pressure, sodium titanate nanofibers formed by reaction of peroxotitanic acid with excess sodium hydroxide at elevated temperature and pressure, and sodium and cesium titanate nanofibers formed by delamination of acid-exchanged micron-sized titanates. In addition, there have been studies reporting the addition of surfactants in sol-gel syntheses to control particle size growth resulting in the production of nano-size titanium dioxide, metal-doped titanium dioxides and multi-metal titanium oxides.

Typically, the kinetics of ion exchange are controlled by film diffusion or intraparticle diffusion, which are largely controlled by the particle size of the ion exchanger. As a therapeutic metal delivery platform, the particle size of the titanate material would be expected to significantly affect the nature of the interaction between the metal-exchanged titanate and the cancer and bacterial cells. Thus, what are needed in the art are methods for the synthesis of nanosized sodium titanates and sodium peroxotitanates and the nanosized products that can be formed according to such methods. Such nanosized sodium titanates could be utilized to enhance ion exchange kinetics and effective capacity in metal ion separation, enhance photochemical properties, as well as to facilitate metal delivery and cellular uptake from the titanate delivery platform.

SUMMARY

Aspects and advantages of the invention will be set forth in part in the following description, or may be obvious from the description, or may be learned through practice of the invention.

According to one embodiment, disclosed is a method for forming nanosized monosodium titanate. The method can include combining a first solution, a second solution and a third solution to form a mixture. The first solution includes a titanium alkoxide, a sodium alkoxide and an alcohol; the second solution includes water and an alcohol; and the third solution includes an alcohol and a non-ionic surfactant. The method also includes heating the mixture to form the nanosized monosodium titanate as a particulate precipitate.

Also disclosed is nanosized monosodium titanate as may be formed according to the methods. The nanosized monosodium titanate is a particulate having a maximum cross-sectional dimension of about 500 nanometers or less with a monodisperse distribution of particle sizes. The nanosized monosodium titanate can exhibit useful properties, such as a BET surface area of about 200 square meters per gram or greater and/or an isoelectric point of about 4 or less.

BRIEF DESCRIPTION OF THE FIGURES

A full and enabling disclosure of the present invention, including the best mode thereof, directed to one of ordinary skill in the art, is set forth in the specification, which makes reference to the appended figure, in which.

DETAILED DESCRIPTION

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, disclosed herein are methods directed to the synthesis and peroxide-modification of nanosized monosodium titanate. The nanosized monosodium titanate is a white, inorganic, amorphous, and poorly crystalline sodium titanate that can have the general composition of $HNaTi_2O_5 \cdot xH_2O$ where x is about 2 to about 4. The materials can exhibit high selectivity for sorbing various metallic ions such as strontium, actinide radioisotopes, gold, and the like, even in the presence of strongly alkaline and high sodium-containing salt solutions.

The synthesis methods utilize a sol-gel process based upon that used to produce micron-sized monosodium titanate. Differences between the disclosed methods and those previously known to form larger particles include differences in reagent concentrations and introduction of a non-ionic surfactant to facilitate control of particle formation and growth. In addition, disclosed methods omit a particle seed step that is required in previously known formation methods.

The sol-gel formation process includes the precipitation of monosodium titanate in a semi-particulate/semi-gel-like state from a reactant mixture followed by a heating step to complete the particulate formation of the nano-sized product. The reactant mixture is formed by the combination of multiple different solutions. Beneficially, the formation process can take place at atmospheric pressure and can be carried out by combining all of the reactants in a single step; i.e., there is no need for an initial seed formation step followed by a second reactant addition step so as to grow the product particles, as is required in the formation of micron-sized monosodium titanates.

One of the solutions for forming the nanosized monosodium titanate can include a titanium alkoxide, a sodium alkoxide, and an alcohol.

Examples of titanium alkoxide compounds that can be used include, without limitation, titanium methoxide, titanium ethoxide, titanium isopropoxide, titanium propoxide, and titanium butoxide. Equivalent names for titanium isopropoxide ($C_{12}H_{28}O_4Ti$) include: tetraisopropyl orthotitanate, titanium tetraisopropylate; tetraisopropyl titanate; isopropyl titanate; titanium isopropoxide; titanium(IV) i-propoxide; tetraisopropoxytitanium(IV), tetraisopropyl orthotitanate; titanium iso-propylate; and orthotitanic acid tetraisopropyl ester and mixtures thereof.

Examples of sodium alkoxide compounds that can be used include, without limitation, sodium methoxide ($NaOCH_3$) (alternatively referred to as sodium methylate), sodium ethoxide, sodium propoxide, and sodium butoxide and mixtures thereof.

Alcohols that can be utilized as solvent include alcohols that are miscible in water such as, without limitation, isopropyl alcohol, methanol, ethanol, propanol, butanol, isopropanol, and mixtures thereof.

As previously mentioned, the reactants can be utilized in lower concentrations than has been utilized in the past for formation of monosodium titanate. For example, a solution of the titanium alkoxide and sodium alkoxide reactants in an alcohol solution having respective concentrations of about 800 millimolar (mmolar) and about 400 mmolar or less. In some embodiments, this solution can include the titanium alkoxide in a concentration of from about 300 mmolar to about 610 mmolar and the sodium alkoxide in a concentration of from about 150 mmolar to about 300 mmolar.

A second reactant solution of the formation process includes water and an alcohol. The alcohol can be the same or different as the alcohol utilized in forming the first reactant solution. The water can generally be ultrapure water (though this is not a requirement of the formation process) and can be provided in this solution at a concentration of about 2.0 molar or less, or between about 1.2 molar and about 1.6 molar in some embodiments.

A third reactant solution of the formation process includes an alcohol (either the same or different as is utilized in forming the other solutions) and a non-ionic surfactant. In general, the non-ionic surfactant can be provided in this solution at a concentration of from about 0.01 moles per mole of the titanium alkoxide component to about 1.2 moles per mole of the titanium alkoxide component, for instance from about 0.05 moles per mole of the titanium alkoxide component to about 0.5 moles per mole of the titanium alkoxide component, or from about 0.1 moles per mole of the titanium alkoxide component to about 0.15 moles per mole of the titanium alkoxide component.

Examples of nonionic surfactants include, but are not limited to, polyethoxylates; polyethoxylated alkylphenols; fatty acid ethanol amides; complex polymers of ethylene oxide, propylene oxide, and alcohols; and polysiloxane polyethers. In one embodiment, the nonionic surfactant can be an aryl alcohol ethoxylate such as those available from Union Carbide under the trade name Triton®. Non-limiting examples of a particular nonionic surfactants include Triton® X-100 that includes an octyl phenol ethoxylate having approximately 9.5 ethylene oxide units, and Triton® X-165 that includes an octyl phenol ethoxylate having approximately 16 ethylene oxide units. In particular, the particle size of the nanosized monosodium titanate appears to be independent of the number of ethylene oxide units of an aryl alcohol ethoxylate surfactant.

Other suitable non-ionic surfactants can include alkyl alcohol ethyoxylates such as a linear alkyl alcohol ethoxylate. A linear alkyl alcohol ethoxylate can include an aliphatic ethoxylate having from about two to twenty-five carbons in the alkyl chain such as from about five to about eighteen carbons in the alkyl chain. In addition, the alkyl alcohol ethoxylate can include from about four to about twelve ethylene oxide units. Exemplary commercially available linear alkyl ethoxylates are available from Sigma-Aldrich under the Brij® designation such as Brij® 52. Another alkyl alcohol ethyoxylate that can be utilized is 2,3,7,9-tetramethyl-5-decyne-4,7-diol ethoxylate available under the trade name Aldrich-461180 from Sigma-Aldrich.

Additional non-ionic surfactants as may be utilized include phosphate surfactants such as polyethylene glycol phosphate (e.g., Merpol® A available from Sigma Aldrich), polyoxyethylene sorbital monolaurate available from Sigma-Aldrich under the name Tween® 20, and linear polymers of ethylene oxide comprising a perfluorinated alkyl chain at one terminus and a hydroxyl group or alkyl group at the other terminus, one example of which include the Zonyl® line of surfactants that are commercially available from Sigma Aldrich, Zonyl® FS300 being one example thereof.

In one embodiment, the solutions can be combined in a single mixing step in which the first solution including the titanium alkoxide, the sodium alkoxide, and alcohol and the second solution including water and alcohol are simultaneously added to the third solution including alcohol and the surfactant. The first and second solutions can generally be added relatively slowly, for instance at a rate about 1.0 cm$^3$/min or less, for instance about 0.5 cm$^3$/min or less.

Following formation, the reaction mixture can be sealed, stirred and then heated. For instance, following stirring for a period of time (e.g., about 24 hours), the reaction mixture can be heated to a temperature corresponding to the boiling point of the alcohol and water azeotrope. For isopropanol the azeotrope boils at about 80° C. to about 82° C. As the alcohol evaporates during the heating step, water can be added to the reaction mixture. The heating can continue until most of the alcohol has evaporated, for example from about 45 minutes to about 90 minutes, following which the container holding the mixture can be purged, for instance with nitrogen, while the mixture is still at the increased temperature.

The resulting mixture can include the formed nanosized monosodium titanate in an aqueous-based slurry. The particulate can be held in the slurry for storage or use or can be separated, washed, and optionally dried according to any suitable process as is known in the art. By way of example, the slurry can be placed on a filter unit connected to a vacuum line. A vacuum can be pulled from beneath the filter, which pulls the supernatant liquid through the filter. The liquid, referred to as filtrate, can typically be collected and discarded. The solids collect on the surface of the filter and are typically referred to as a filter cake. Finally, water (or other solvents could be used) can then be added to the top of the filter cake and allowed to flow through the solids to displace any remaining alcohol and surfactant that remain with the solids. This water-washing step may be repeated several times, so that liquid remaining in the filter cake becomes essentially that of the washing fluid (e.g., water), with essentially no alcohol or surfactant remaining. In one embodiment, the filter cake can then be dried, for instance in air at room temperature, under vacuum at increased temperature, or some combination thereof, to provide a dried particulate product.

The nanosized monosodium titanate particulate formed according to the disclosed methods can exhibit spherical-shaped particle morphology with a monodisperse distribution of particle diameters. For instance, the maximum particle cross-sectional dimension can be about 500 nm or less, or about 300 nm or less in some embodiments. For example, the maximum particle cross sectional dimension can be in the range from 100 to 150 nm.

The BET surface area and isoelectric point of the nanosized materials can be more than an order of magnitude higher and a pH unit lower, respectively, than that measured for larger micro-sized MST. For example, the BET surface area can be about 200 m$^2$g$^{-1}$ or greater. In some embodiments the BET surface area can be from about 200 m$^2$ g$^{-1}$ to about 350 m$^2$ g$^{-1}$, for instance 285 m$^2$ g$^{-1}$. The isoelectric point can be from about 3.1 pH units to about 3.5 pH units in some embodiments, for instance 3.34 pH units in one embodiment.

Following formation the nanosized monosodium titanate can be further treated. For instance, the nanosized monosodium titanate can be treated with a peroxide to convert the monosodium titanate to a peroxo-titanate form, which has been shown to improve the sorption capabilities of the materials.

Peroxide treatment of the nanosized monosodium titanate can be carried out similar to a treatment process as can be utilized for micron-sized monosodium titanate and described in U.S. Pat. No. 7,494,640 to Nyman, et al., which is incorporated herein by reference. For example, a solution of hydrogen peroxide (e.g., about 30 wt. % hydrogen peroxide) can be added dropwise to a suspension of nanosized monosodium titanate. The reaction mixture can be stirred for a period of time (e.g., about 24 hours) at ambient temperature. Upon treatment, the color of the nanosized materials will change from white to yellow. The yellow color is due to the $\eta^2$-boundprotonated hydroperoxo-titanium ligand-to-metal-charge-transfer absorption at 385 nm. Peroxide treatment of the nanosized monosodium titanate can be carried out without alteration of the particle size or morphology of the particulates.

The nanosized monosodium titanate materials can be utilized in a variety of applications. For instance, the materials can serve as an effective ion exchanger under both weakly acidic and strongly alkaline conditions and can be easily converted to a peroxotitanate form by reaction with hydrogen peroxide. As such, the materials can be beneficially utilized in removal of $^{90}$Sr and alpha-emitting radionuclides from high-level radioactive waste solutions. The materials can also be utilized in medical applications, for instance as a delivery platform and/or a chelating agent.

The present application may be further understood by reference to the following Examples.

EXAMPLES

Materials

All chemicals were used as received without further purification. Titanium (IV) isopropoxide (TITP) was obtained from either Alfa Aesar (Ward Hill, Mass.) or Sigma-Aldrich (St. Louis, Mo.), titanium (IV) oxide was obtained from Sigma-Aldrich, and sodium hydroxide solution (50 wt %) was obtained from Fisher Scientific (Pittsburgh, Pa.). HPLC grade isopropyl alcohol (Chromasolv®; absolute, 99.9%) and sodium methoxide in methanol (30 wt %) were obtained from Sigma-Aldrich. The surfactants 2,4,7,9-tetramethyl-5-decyne-4,7-diol ethoxylate; Brij® 52; cetyltrimethylammonium bromide (CTAB); sodium docusate; Merpol® A; Triton® X-15; Triton® X-45; Triton® X-100; Triton® X-165; Triton® X-405; and TWEEN® 20 were obtained from Sigma-Aldrich. Zonyl® FS300 was obtained from Fluka Analytical division of Sigma-Aldrich (St. Louis, Mo.). ACS reagent grade hydrogen tetrachloroaurate(III), $HAuCl_4.3H_2O$, was purchased from Sigma-Aldrich. The salt solution containing radioisotopes of $^{85}Sr$ and actinides was prepared from reagent grade chemicals as is known in the art. The $^{85}Sr$ was obtained from Perkin-Elmer Life and Analytical Sciences (Boston, Mass.). Actinide sources included uranyl nitrate hexahydrate, $UO_2(NO_3)_2.6H_2O$, which was obtained from Mallinckrodt (Hazelwood, Mo.) and nitric acid solutions of plutonium(IV) ($^{239,240}Pu$) and neptunium(V) ($^{237}Np$), which were obtained from plutonium and neptunium production operations at the Savannah River Site. Ultrapure water was supplied by a MilliQ Element water purification system.

Instruments

Dynamic light scattering (DLS) measurements used a Malvern (Worcestershire, UK) Zetasizer® 3000 HSA instrument. Characterization of solids by transmission electron microscopic (TEM) analyses used a JEOL JEM 2010® instrument (Peabody, Mass.) operated at 200 keV and equipped with a light element energy dispersive X-ray analysis system that is sensitive to elements down to and including boron. Scanning electron microscopic (SEM) analyses used a Zeiss Ultra Plus® Thermal Field Emission Scanning Electron Microscope (Thornwood, N.Y.) with an Inlense detector at 20 keV.

The products were also characterized by X-ray diffraction (XRD), inductively coupled plasma emission spectroscopy (ICP-ES), zeta potential, BET surface area, and Fourier Transform Infrared (FT-IR) spectroscopic analyses. XRD powder patterns were obtained using a Bruker D8 Advance X-ray Diffractometer (Madison, Wis.). Sodium and titanium content were determined by dissolving measured amounts of dried solids in concentrated nitric acid, dilution of the acidic solutions to a known volume and measurement of Ti and Na concentrations using a Leeman Prodigy® Inductively Coupled Plasma Emission Spectrometer from Teledyne Leeman Labs (Hudson, N.Y.).

A Zeta Plus® zeta potential analyzer from Brookhaven Instruments Corporation (Holtsville, N.Y.) was used to measure zeta potentials. The potentiostat was operated in multi-cycle mode measuring 40 measurements per sample and 2 cycles per measurement at 25±0.1° C. FT-IR spectra were collected on dried samples using a Nicolet Nexus® 6700 FT-IR and Continuum Microscope Imaging System from Thermo Scientific (Barrington, Ill.). Surface area measurements were obtained by BET analysis of nitrogen absorption isotherms using a Micromeretics ASAP® 2020 Physisorption Analyzer (Norcross, Ga.).

Example 1

Synthesis of Nano-Monosodium Titanate

A first solution—Solution 1—was formed that contained 1.80 cm³ (6 mmol) of TITP, 0.58 cm³ (3 mmol) of ~30 wt % sodium methoxide, and 7.62 cm³ of isopropanol.

A second solution—Solution 2—was formed that contained 0.24 cm³ (13.5 mmol) of ultrapure water and 9.76 cm³ of isopropanol.

Solutions 1 and 2 were added simultaneously by two syringe pumps to a well-stirred solution of 280 cm³ isopropanol. In certain samples this solution also included 0.44 cm³ of a surfactant (e.g., Triton® X-100 (average MW: 625 g/mol⁻¹)). This step was carried out in a 500 cm³ 2-neck round bottom flask. The rate of addition for solutions 1 and 2 was 0.333 cm³ min⁻¹. After adding Solutions 1 and 2, the flask was sealed and stirred for 24 hours.

The reaction mixture was heated to 82° C. for 90 minutes followed by purging with nitrogen while maintaining 82° C. As the isopropanol evaporated, ultrapure water was added dropwise. After most of the isopropanol evaporated and the water volume was approximately 50 cm³, the heat was removed. The aqueous slurry was then filtered through 0.1-μm nylon membrane filter and the collected product was washed with water to remove any surfactant and any remaining isopropanol. The product was typically stored as aqueous slurry. For powder XRD and BET surface area measurements the nanosized monosodium titanate was first dried in a vacuum oven at 60° C. overnight.

Synthesis of Peroxide Modified-Nano-Monosodium Titanate

Modification of the nanosized monosodium titanate was carried out using a post-synthesis peroxide treatment similar to one reported previously for micron sized titanates. Briefly, a solution of 30 wt. % $H_2O_2$ (0.154 g, 1.3 mmol) was added dropwise to a well-stirred suspension of the nanosized monosodium titanate formed as described (0.490 g; ~4.1 mmol) in 5.0 g water. The final $H_2O_2$:Ti molar ratio was targeted to be 0.25:1. Upon $H_2O_2$ addition the suspension of white solids immediately turned yellow. The reaction mixture was stirred for 24 hours at ambient laboratory temperature. The peroxide-modified solids were separated by filtration using a Nalgene® disposable filter having a 0.1 μm nylon membrane. The filtered solids were washed with water to remove any unreacted $H_2O_2$ and stored as an aqueous suspension containing approximately 15 wt. % solids.

Synthesis of Micron-Sized Monosodium Titanate

Micron-sized monosodium titanate was prepared by a sol-gel method in which tetraisopropoxytitanium(IV) (TIPT), sodium methoxide and water were combined and reacted in isopropanol to form seed particles of monosodium titanate. Micron sized particles were then grown by controlled addition of additional quantities of the reagents resulting in a particle morphology that featured an amorphous core and an outer fibrous region.

Results

Figure 1:
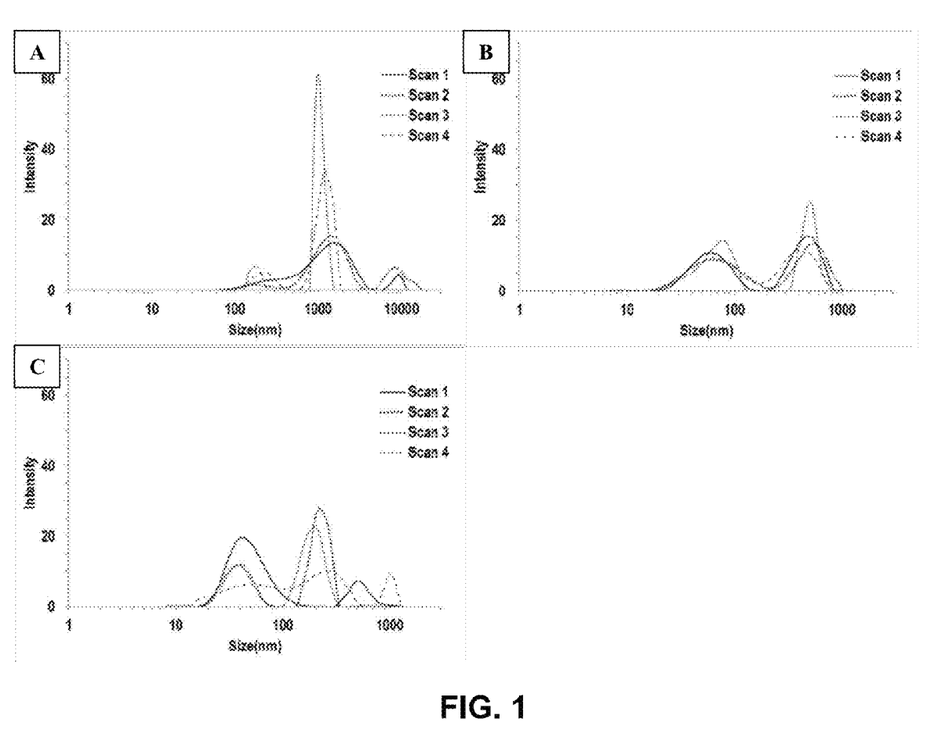
FIG. 1 illustrates particle size distributions for micron-sized monosodium titanate (FIG. 1A), sodium titanate synthesized under dilute reagent conditions with no surfactant (FIG. 1B) and the material of FIG. 1B after 48 hours of reaction (FIG. 1C).

Initial experiments investigated particle growth without a seed step and using much more dilute reagent concentrations without the addition of a surfactant. DLS was used to track the gel/particle growth with time. FIG. 1 shows the size distribution measurements acquired by DLS for micron-sized monosodium titanate formed as described above (FIG. 1A) and that for a similar sodium titanate synthesis but using more dilute reagent concentrations (FIG. 1C). The final solvent:TIPT volume ratio in the second synthesis was 165 compared to 5.14 in the micron-sized synthesis representing a reagent dilution of ~32 during the synthesis. Note that during reagent addition the solvent:TIPT ratio was initially much larger than 32 and steadily decreased as the reagent addition completed.

Micron-sized monosodium titanate prepared in the standard sol-gel method with a seed step showed a bimodal distribution of particle sizes with the majority of particles around one micron (FIG. 1A). The monosodium titanate prepared under more dilute reagent conditions and without a seed stage exhibits a bimodal distribution with particle sizes centered at 50-100 nm and at 500 nm after 24 hours of reaction (FIG. 1B). After 48 hours of reaction (FIG. 1C), a trimodal distribution is visible with the appearance of particles measuring 1000 nm (1 μm) in size. DLS measurements at shorter reaction times show a bimodal distribution of particle sizes similar to that shown in FIG. 1B except the distribution is centered at smaller particle sizes. Thus, it was concluded that the reduced reagent concentrations and absence of the seed step indicate smaller particles are produced initially, but particle growth continues, resulting in a mixture of both nano- and micron-sized monosodium titanate particles.

A number of non-ionic surfactants were examined for use in forming the nanosized monosodium titanate including Brij® 52; Merpol® A; Triton® X series (X-15, X-45, X-100, X-165, X-405); TWEEN® 20; 2,4,7,9-tetramethyl-5-decyne-4,7-diol ethoxylate; and Zonyl® FS300) as well as one anionic surfactant (sodium docusate) and one cationic surfactant (CTAB).

Figure 2:
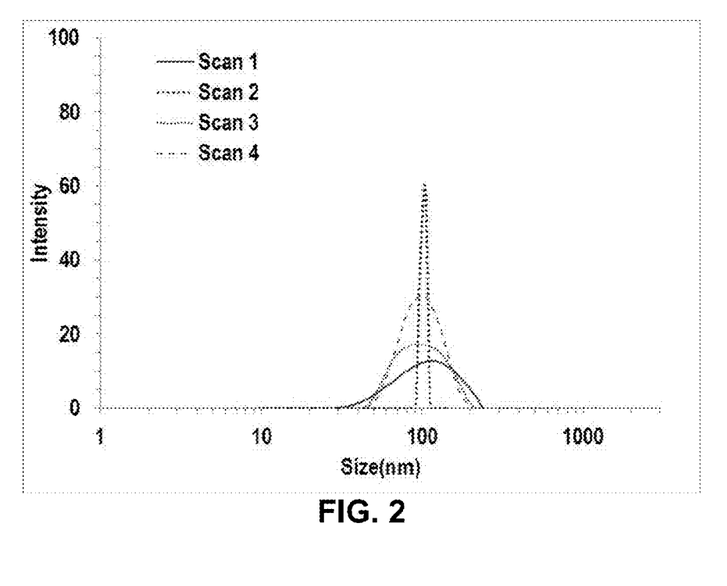
FIG. 2 illustrates the dynamic light scattering (DLS) spectrum for nanosized monosodium titanate formed utilizing Triton® X-15 as the surfactant.
Figure 3:
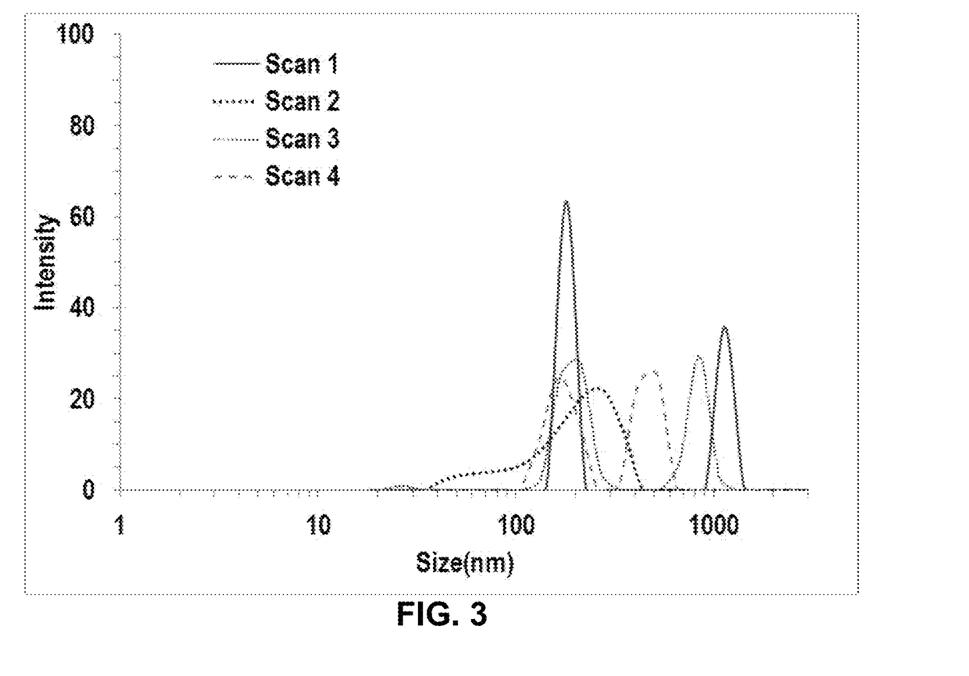
FIG. 3 illustrates the DLS spectrum for nanosized monosodium titanate formed utilizing Triton® X-45 as the surfactant.
Figure 4:
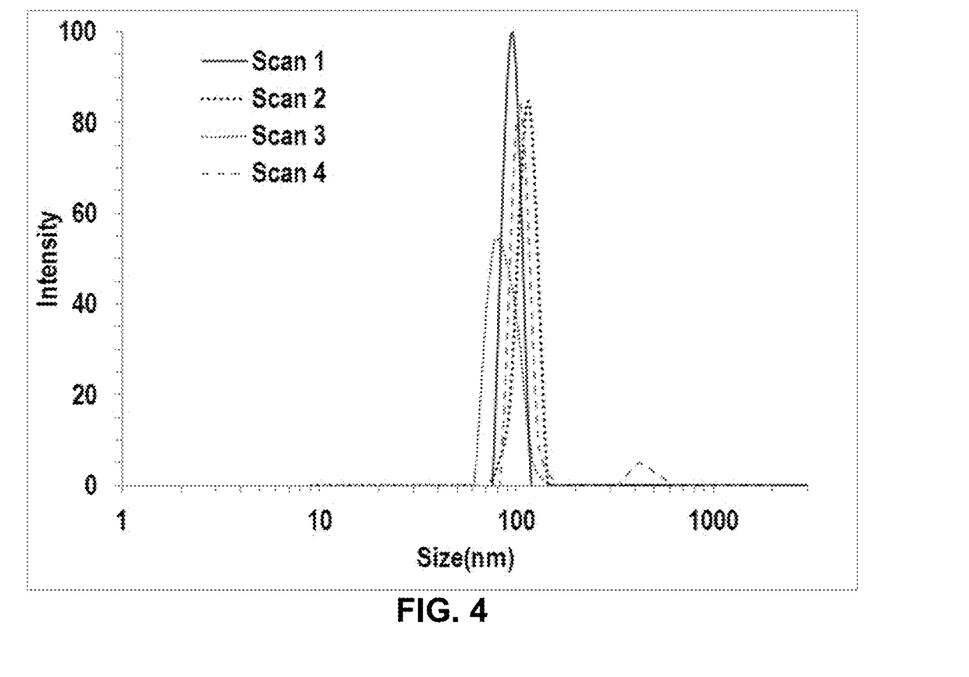
FIG. 4 illustrates the DLS spectrum for nanosized monosodium titanate formed utilizing Triton® X-100 as the surfactant.
Figure 5:
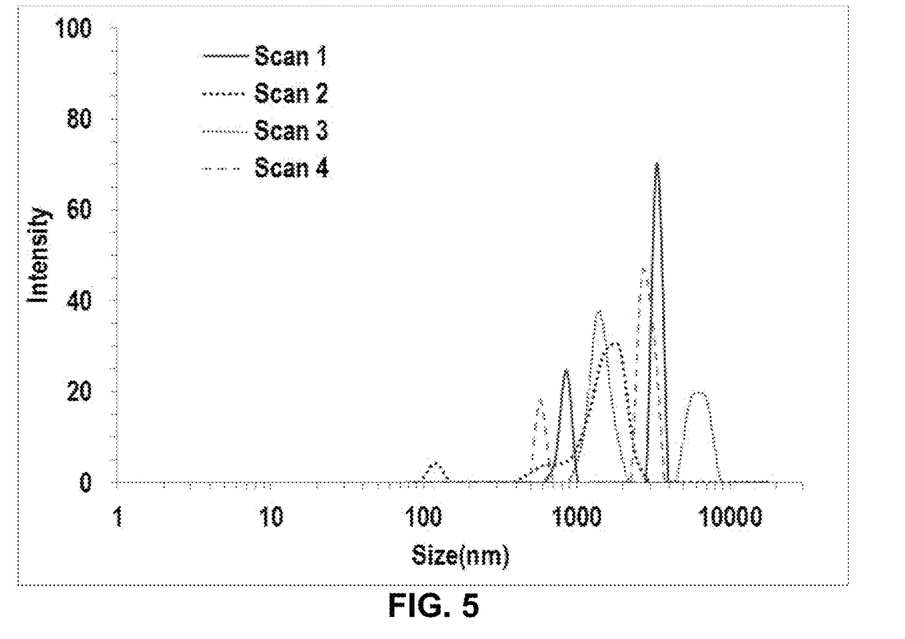
FIG. 5 illustrates the DLS spectrum for nanosized monosodium titanate formed utilizing Triton® X-405 as the surfactant.
Figure 6:
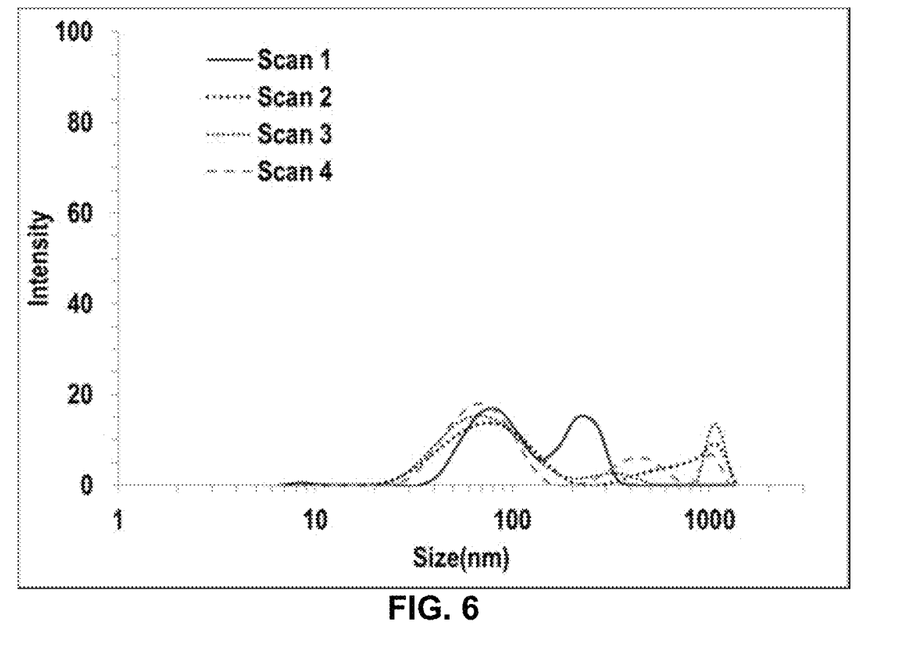
FIG. 6 illustrates the DLS spectrum for nanosized monosodium titanate formed utilizing Brij® 52 as the surfactant.
Figure 7:
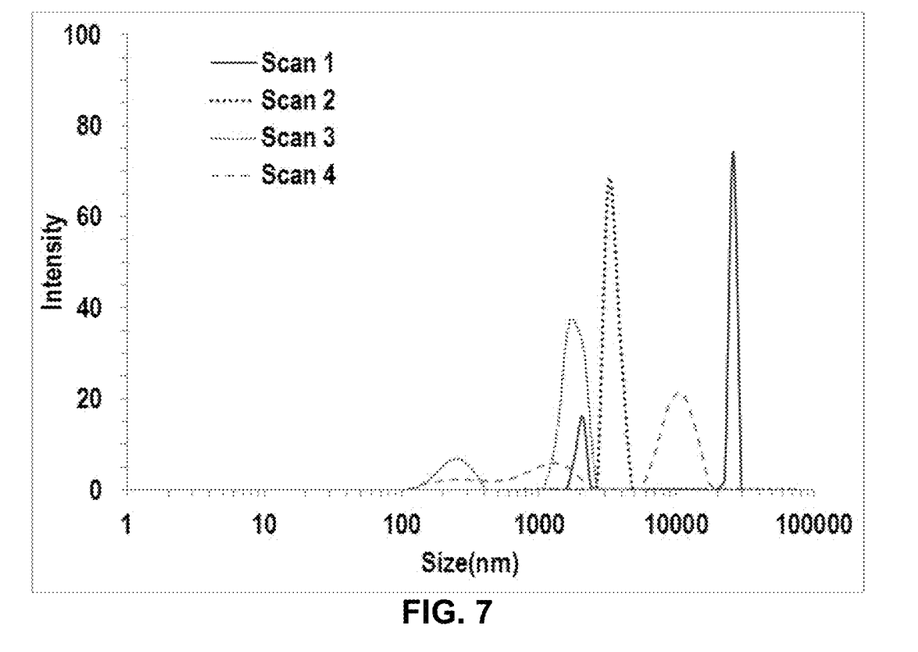
FIG. 7 illustrates the DLS spectrum for nanosized monosodium titanate formed utilizing cetyltriammonium bromide as the surfactant.
Figure 8:
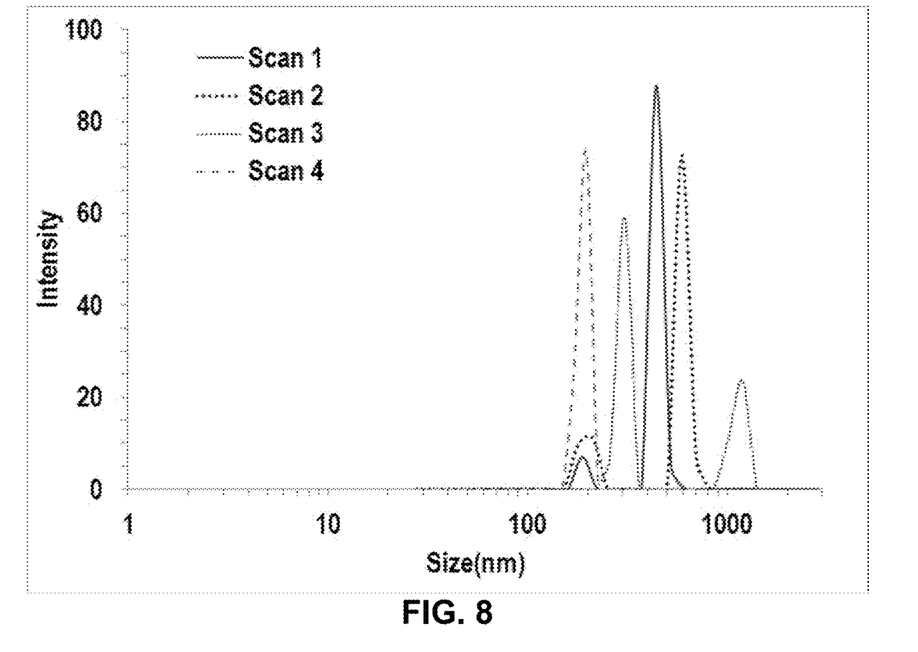
FIG. 8 illustrates the DLS spectrum for nanosized monosodium titanate formed utilizing Merpol® A as the surfactant.
Figure 9:
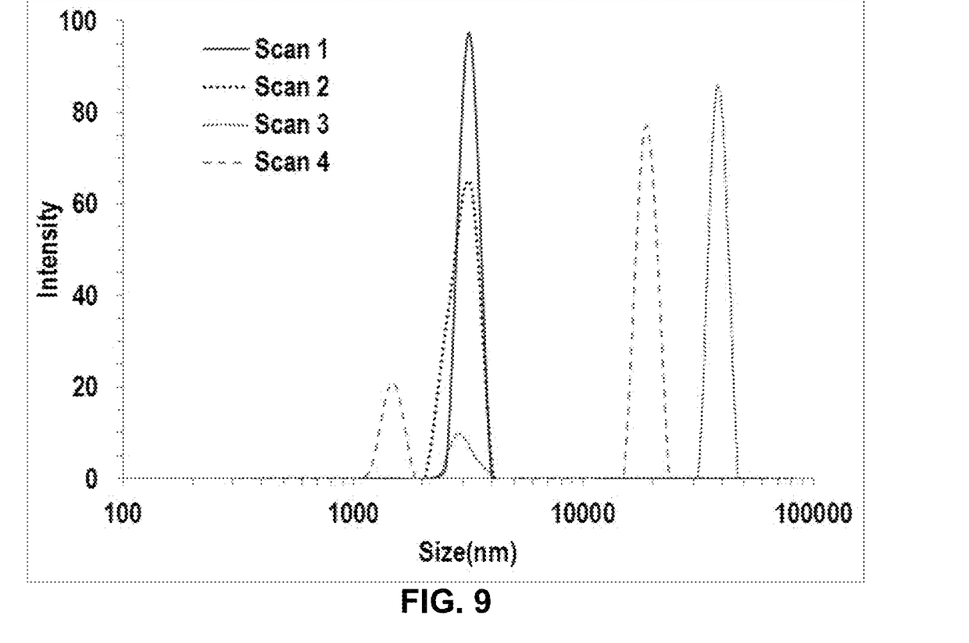
FIG. 9 illustrates the DLS spectrum for nanosized monosodium titanate formed utilizing sodium docusate as the surfactant.
Figure 10:
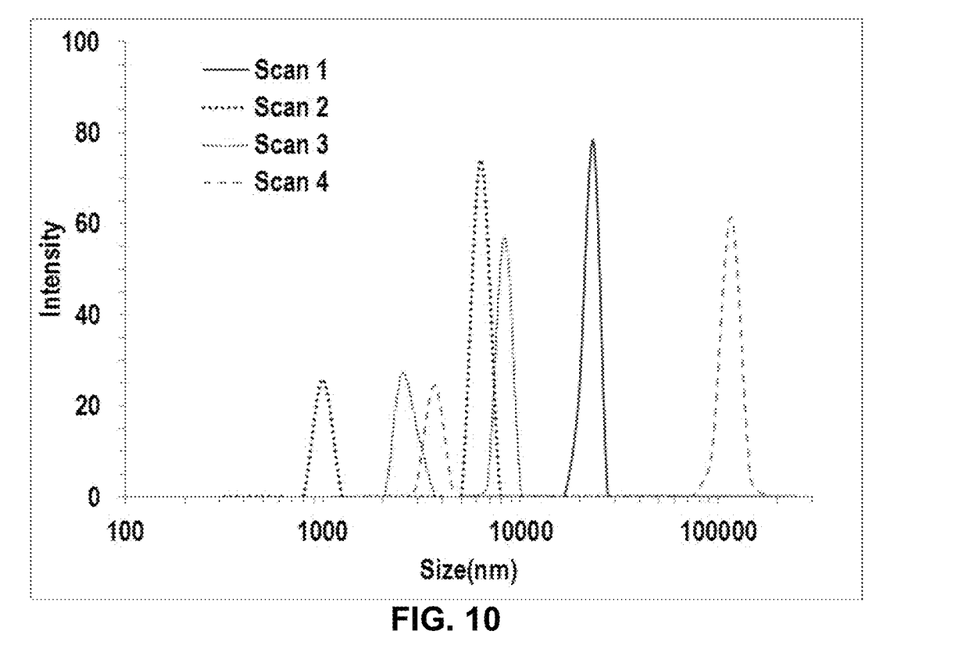
FIG. 10 illustrates the DLS spectrum for nanosized monosodium titanate formed utilizing 2,4,7,9-tetramethyl-5-decyne-4,7-diol as the surfactant.
Figure 11:
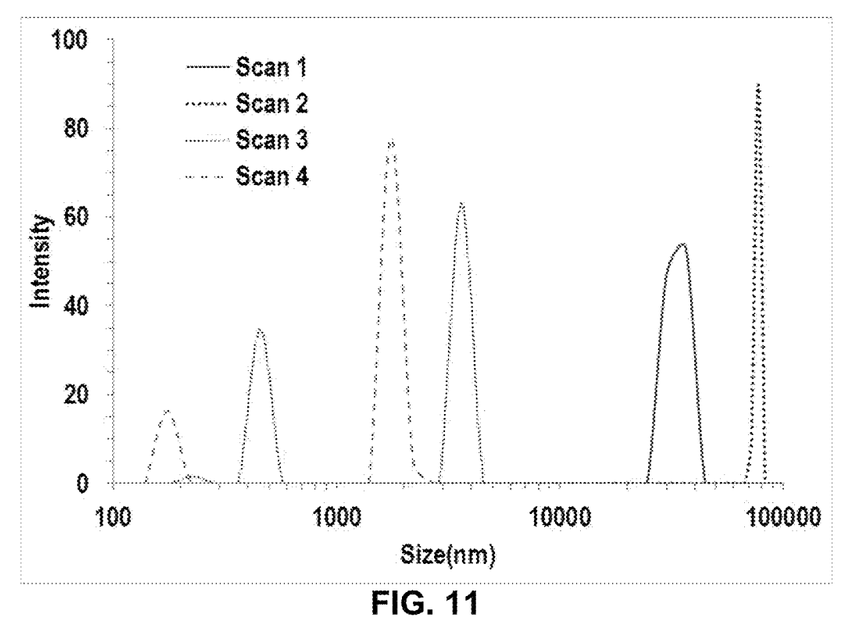
FIG. 11 illustrates the DLS spectrum for nanosized monosodium titanate formed utilizing Tween® 20 as the surfactant.
Figure 12:
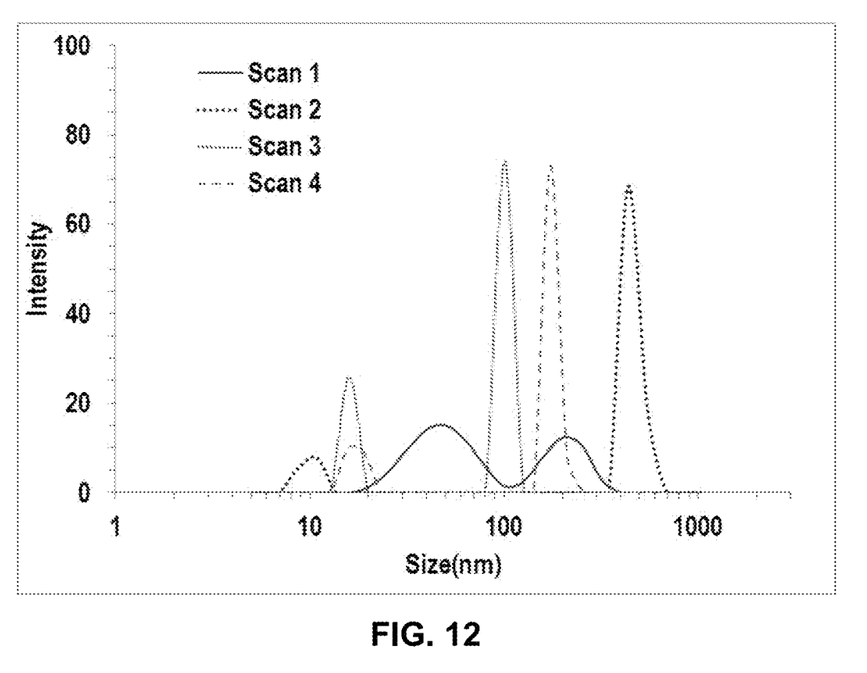
FIG. 12 illustrates the DLS spectrum for nanosized monosodium titanate formed utilizing Zonyl® FS300 as the surfactant.

Surfactant screening tests were carried out using a surfactant concentration of approximately 0.12 mole of surfactant per mole of TIPT. After mixing at ambient laboratory temperature for 24 hours, the reaction suspensions were analyzed by DLS for polydispersity and average particle size. Triton® X-100, Triton® X-165, Brij® 52, and Zonyl® FS300 showed a good combination of small particle size ($Z_{ave}$<150 nm) and monodispersity, with Triton® X-100 and Triton® X-165, showing the most narrow range of particle sizes among all of the surfactants tested. DLS spectra for each surfactant are provided in FIG. 2 (Triton® X15), FIG. 3 (Triton® X45), FIG. 4 (Triton® X100), FIG. 5 (Triton® X405), FIG. 6 (Brij® 52), FIG. 7 (cetyltriammonium bromide), FIG. 8 (Merpol® A), FIG. 9 (sodium docusate), FIG. 10 (2,4,7,9-tetramethyl-5-decyne-4,7-diol), FIG. 11 (Tween® 20), and FIG. 12 (Zonyl® FS300).

Reaction progress was also monitored by DLS on an hourly basis for the reactions carried out with Triton® X-100 and Triton® X-165. Table 1, below, shows the average particle size, $Z_{ave}$, for the first 24 hours of synthesis for nanosized monosodium titanate using the surfactant, Triton X-165. $Z_{ave}$ is observed to increase steadily over time for the first 24 hours to a final value of 110 nm. An increase in the counts per second is also observed which could indicate either the formation of additional particles or an increase in particle size since larger particles scatter more light. The addition of Triton® X-100 produced very similar results to that shown for Triton® X-165. Thus, a change in the number of ethylene oxide units from 9.5 for Triton® X-100 to 16 for Triton® X-165 did not significantly alter the particle size of the nanosized monosodium titanate.

TABLE 1

| Elapsed Time (h) | KCps | $Z_{ave}$ (nm) | Elapsed Time (h) | KCps | $Z_{ave}$ |
|---|---|---|---|---|---|
| 1:00 | 38.6 | 56.5 | 13:00 | 313.0 | 99.0 |
| 2:12 | 74.5 | 62.0 | 14:12 | 351.4 | 101.7 |
| 3:24 | 113.5 | 67.3 | 15:24 | 385.3 | 103.9 |
| 4:36 | 183.0 | 76.1 | 16:36 | 420.8 | 103.6 |
| 5:48 | 251.4 | 82.2 | 17:48 | 458.9 | 105.5 |
| 7:00 | 322.5 | 86.5 | 19:00 | 495.6 | 106.2 |
| 8:12 | 392.3 | 89.4 | 20:12 | 533.6 | 107.5 |
| 9:24 | 478.4 | 92.9 | 21:24 | 243.3 | 108.6 |
| 10:36 | 243.8 | 95.7 | 22:36 | 260.9 | 109.6 |
| 11:48 | 276.2 | 97.1 | 23:48 | 279.0 | 110.0 |

Additional tests were also carried out to determine the effects of different surfactant concentrations on the particle size. For these tests surfactant concentrations were varied between approximately 0.012 and 1.2 moles of surfactant per mole of TIPT. At the higher surfactant concentration (1.2 molar ratio) broader distribution of particle sizes by DLS measurements was observed. Furthermore, the nanosized monosodium titanate particles required more extensive washing to remove the surfactant after the synthesis at the higher concentrations. At the lower surfactant concentration bimodal particle distributions were observed suggesting that there is insufficient surfactant to limit the growth of particles beyond nanometer dimensions.

Particle Size and Morphology

Figure 13:
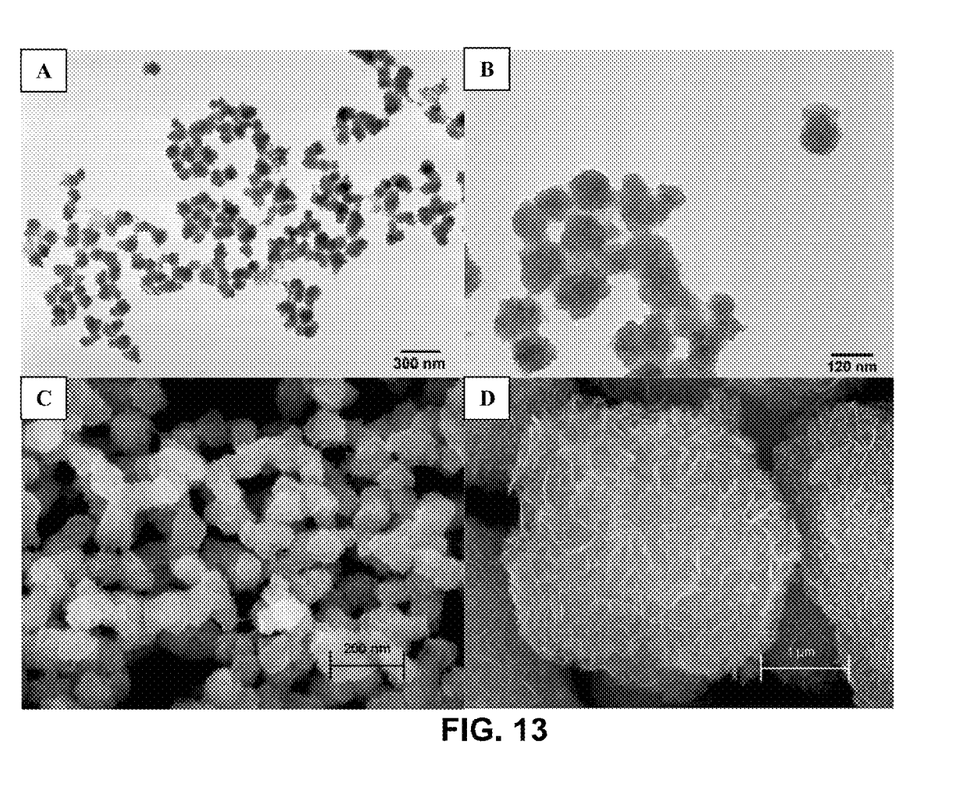
FIG. 13 provides transmission electron microscopy (TEM) images for nanosized monosodium titanate (FIG. 13A and FIG. 13B), scanning electron microscopy (SEM) image for nanosized monosodium titanate (FIG. 13C) and SEM image for micron-sized monosodium titanate (FIG. 13D).

TEM and SEM were utilized to confirm particle size and morphology of the nano-scale titanate products. FIG. 13 provides TEM and SEM images of the isolated solids including nanosized monosodium titanate (FIG. 13A and FIG. 13B), scanning electron microscopy (SEM) image for nanosized monosodium titanate (FIG. 13C) and SEM image for micron-sized monosodium titanate (FIG. 13D) and indicates that the nanosized monosodium titanate particles have a roughly spherical shape and a relatively narrow size range from about 100 to 150 nm in diameter. Some aggregation of the particles was observed, which was attributed to drying in preparing the samples for TEM analysis. Like micron-sized monosodium titanate, the nanosized monosodium titanate appeared to have a fibrous or ribbon-like surface in the SEM images.

Figure 14:
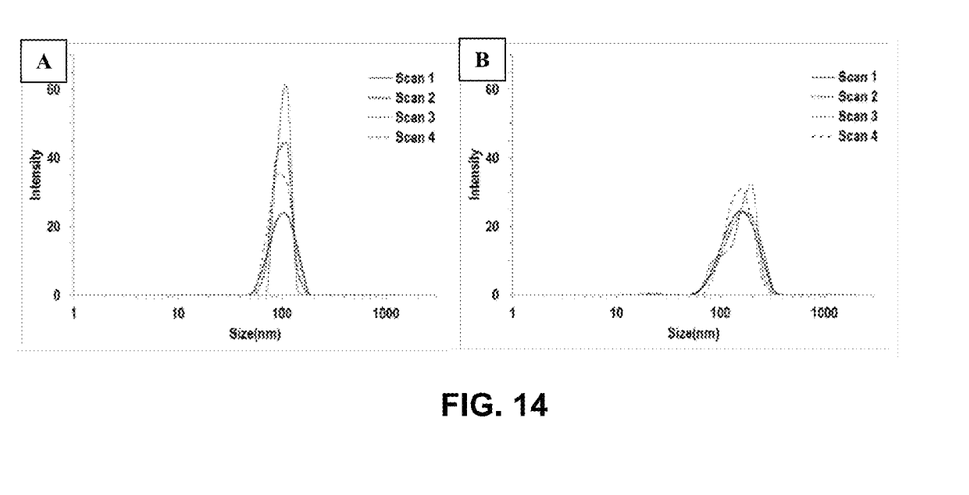
FIG. 14 illustrates particle size distributions (nm) for nanosized monosodium titanate synthesized in the presence of the surfactant, Triton X-165, after 24 hours (FIG. 14A), $Z_{ave}$=100±1 nm, and after 7 days (FIG. 14B), $Z_{ave}$=143±1 nm.

TEM images and DLS measurements were acquired immediately following the synthesis of the nanosized monosodium titanate and after several weeks to determine particle stability when stored in an aqueous solution. DLS measurements (FIG. 14) showed an increase in $Z_{ave}$, from 100 nm after 24 hours (FIG. 14A) to 143 nm after 7 days (FIG. 14B) in the presence of Triton® X-100, which suggests either continued particle growth or agglomeration. After 7 days, no further changes in particle size were observed by DLS.

Figure 15:
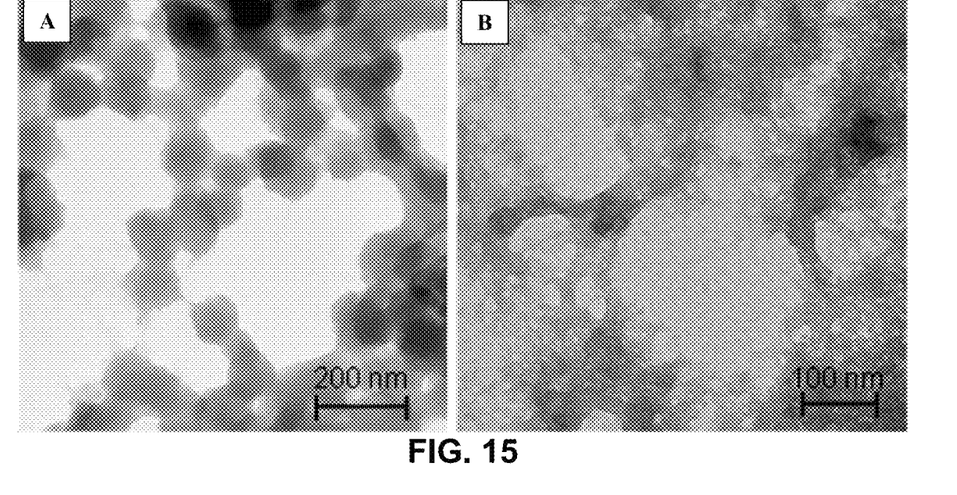
FIG. 15 illustrates TEM images of nanosized monosodium titanate after heating (FIG. 15A) and before heating (FIG. 15B) to 82° C. for 45 minutes.

FIG. 15 shows TEM images before and after heating the initial precipitate to 82° C. Before heating, the reaction product appears as a semi-particulate/semi-gel-like state (FIG. 15B). Following heating, the product appears solid and particulate in nature (FIG. 15A). Thus, it appeared that the low temperature heating for 45 minutes completed particulate formation of the nanosized monosodium titanate.

Reaction with Hydrogen Peroxide

Figure 16:
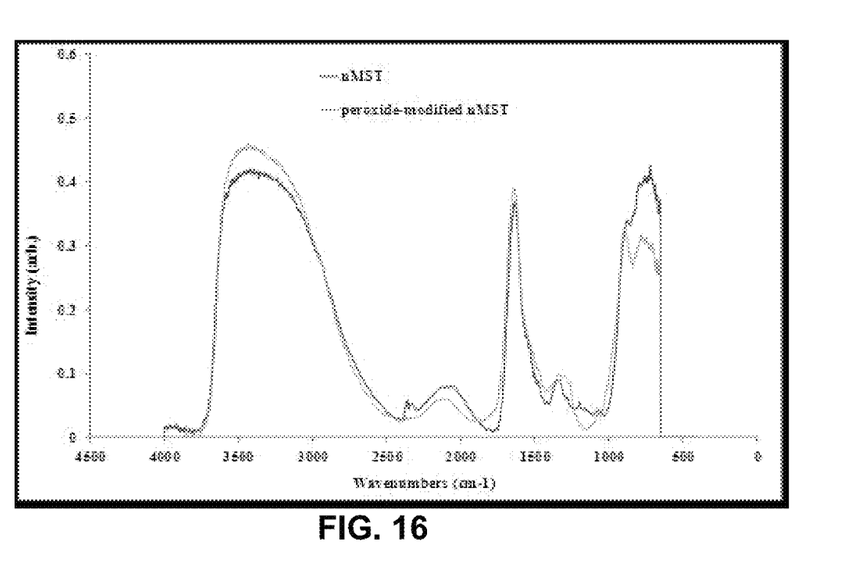
FIG. 16 illustrates the FT-IR absorption spectra of nanosized monosodium titanate (black) and peroxide-modified nanosized monosodium titanate (gray).

FT-IR spectroscopy of the peroxide treated nanosized monosodium titanate confirmed the formation of the peroxotitanate species as evidenced by the appearance of an absorption band at 883 cm$^{-1}$ for the peroxide-modified materials (FIG. 16, gray line), which is absent in the untreated material (black line). The observed band at 883 cm$^{-1}$ is very near the region of 845-875 cm$^{-1}$ that is reported for the O—O stretching vibration in peroxides. DLS, TEM and SEM analyses indicated that the particle size and morphology is retained after reacting nanosized monosodium titanate with hydrogen peroxide.

Sodium and titanium content of nano- and micron-sized monosodium titanate were determined by dissolving a dried sample of each material in nitric acid solution and analyzing using ICP-ES. Prior to drying, each titanate sample was pH adjusted to 8.0 as these materials will hydrolyze releasing protons or Na$^+$ as the pH changes. The empirical formula of monosodium titanate is reported as $HNaTi_2O_5$, which indicates a Na:Ti mole ratio 0.5. Experimentally, Na:Ti ratios of 0.37 and 0.45 were measured for nanosized monosodium titanate and the micron-sized monosodium titanate, respectively. Thus, at a pH of 8.0 the empirical formula for the nanosized particulates was $H_{1.26}Na_{0.74}Ti_2O_5$ and for the micron-sized particulates was $H_{1.1}Na_{0.9}Ti_2O_5$.

Given the somewhat low sodium content of the nanosized product, the synthesis was repeated with a five-fold increase in the quantity of $NaOCH_3$. DLS and TEM measurements confirmed similar particle size and morphology for the solids isolated for this synthesis batch compared to the early synthesis. After washing to a pH of 8, determination of Na and Ti content revealed a Na:Ti ratio of 0.50 consistent with an empirical formula of $HNaTi_2O_5$.

Characterization of the nanosized monosodium titanate also included surface area and isoelectric point (IEP) determination. Surface area measurements were obtained by BET analysis of nitrogen absorption isotherms. The BET surface area measured 20 $m^2 g^{-1}$ for micron-sized monosodium titanate and 285 $m^2 g^{-1}$ for nanosized monosodium titanate. The higher surface area for the nanosized particulate compared to the micron-sized particulate is consistent with the much smaller particle size of the product.

Zeta potential measurements were performed over a range of pH conditions to determine the IEP for the nano and micro titanates. The isoelectric points determined are as follows: nanosized monosodium titanate=3.34; peroxide-modified nanosized monosodium titanate=2.05; micron-sized monosodium titanate=4.46; peroxide-modified micron-sized monosodium titanate=3.43. The nanoscale titanates exhibited lower IEP than the micron-sized particulates indicating a higher fraction of surface sites available for protonation. This would be expected given the order of magnitude higher surface area of the nanoscale materials. Conversion of the nanosized monosodium titanate to the peroxide-modified form lowered the IEP by more than a pH unit. A similar trend was observed upon conversion of the micron-sized materials to the peroxo form. The lower IEP for the peroxide-modified materials likely resulted from the presence of non-bridging peroxo species that can be easily protonated and deprotonated.

Example 2

Au(III) Ion Exchange

For Au ion exchange, 6.0 $cm^3$ of a 30.9 mM solution $HAuCl_4.3H_2O$ (pH 3.0) was combined with a suspension of nanosized monosodium titanate, diluted with water to a final volume of 14.4 $cm^3$ and mixed at ambient laboratory temperature for 11 days. The solids and solution were separated by filtration and separately analyzed for Au, Ti and Na content by ICP-ES.

Sr(II) and Pu(IV) Ion Exchange

Separation of strontium and plutonium was evaluated by contacting the appropriate ion exchanger with a strongly alkaline (free $OH^-$=1.33 M), high ionic strength (Z=6.1 M, [Na]=5.6 M) salt solution that simulates the typical composition of high-activity nuclear waste solutions from nuclear materials production. Batch contact tests, sampling methods and analytical protocols followed that previously reported using 60 $cm^3$ of the radioactive salt solution, temperature controlled at 25±3° C., and the ion exchanger added at a concentration of 0.4 $gL^{-1}$. Decontamination factors were calculated by dividing the initial sorbate concentration by the concentration measured after a period of time in contact with the ion exchanger.

Ion Exchange Properties

Two tests were conducted to determine if the nanosized monosodium titanate exhibited ion exchange. The performance of these nanosize materials was compared to that of the larger micron-sized monosodium titanate. The first experiment evaluated the exchange of Au(III) from a pH 3 solution, whereas the second experiment evaluated the removal of strontium and plutonium from a simulated nuclear waste solution.

ICP-ES analysis of the filtrates after an 11-day contact period indicated loss of $Au^{3+}$ and an increase in $Na^+$ concentration. Analysis of the solids showed the presence of Au and reduced Na content. These findings confirm that $Au^{3+}$ exchanged for $Na^+$ on nanosized monosodium titanate. The measured ratio of exchanged $Na^+$ to that of $Au^{3+}$ measured 4.08 for nanosized monosodium titanate compared to a theoretical value of 3.00. The higher ratios suggest additional exchange of $Na^+$, which could be by protons since the gold chloride solution is acidic (pH 3.0). Based on solution analyses, the nanosized monosodium titanate removed 93.6% of the dissolved $Au^{3+}$. The gold loading in the isolated solids measured 228 mg Au/g Ti. The gold loading for the micron-sized MST was previously measured at 185 mg Au/g Ti. Thus, the nanosized particulate exhibits approximately 25% higher loading capacity for $Au^{3+}$ than the micron-sized materials.

TEM images of the nanosize titanates after exchange with $Au^{3+}$ showed the presence of gold with no observable changes in the particle morphology. Previously, X-ray absorption spectroscopic analysis of micron-size monosodium titanate that had been exchanged with either $Sr^{2+}$ or $UO_2^{2+}$ ions revealed inner sphere coordination of the strontium and uranium with oxygen atoms of the octahedral titania framework. While not wishing to be bound to any particular theory, it is believed that $Au^{3+}$ is incorporated into the lattice of the micron- and nanosized titanates by coordinating to the oxygen atoms of titania as was observed for $Sr^{2+}$ or $UO_2^{2+}$ with the micron-size materials.

Figure 17:
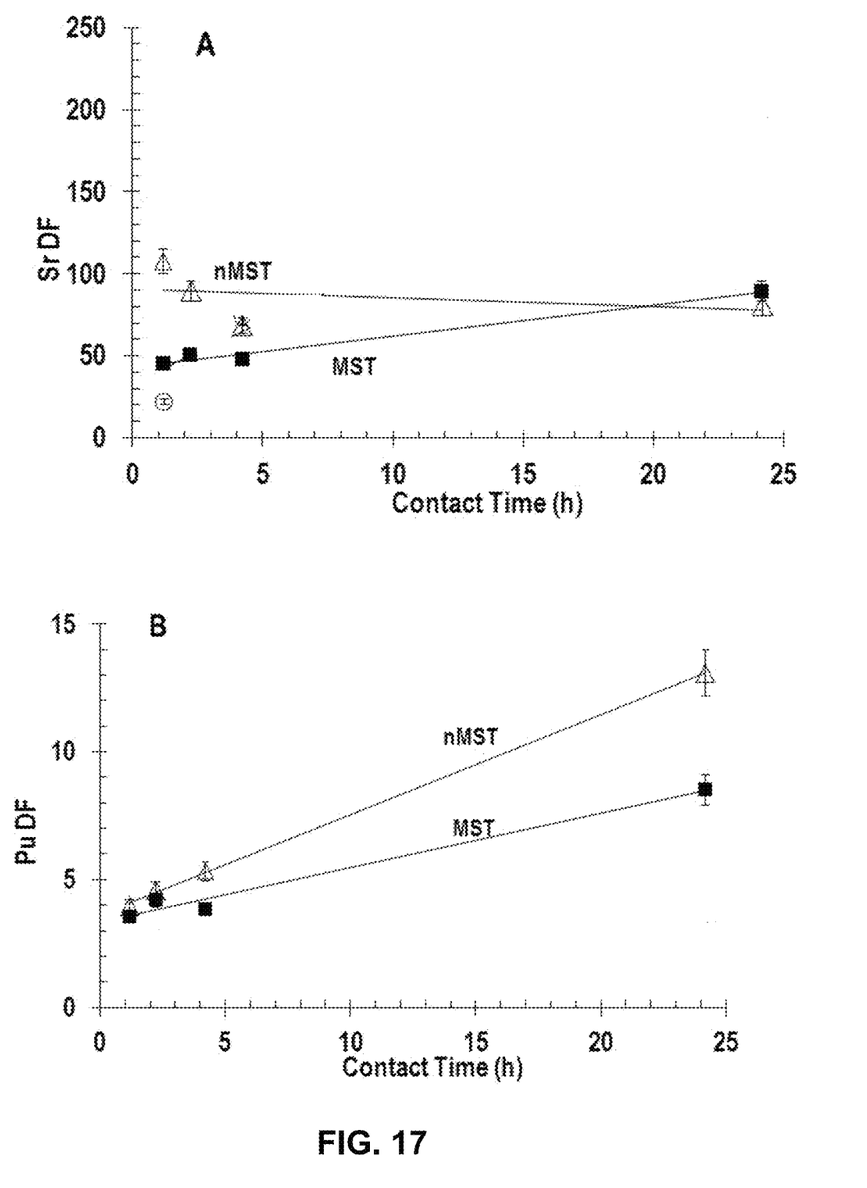
FIG. 17 illustrates plots of strontium decontamination factors (DF) (FIG. 17A) and plutonium DF values (FIG. 17B) versus time measured upon contact of nano- and micron-sized monosodium titanate with simulated alkaline waste solution.

FIG. 17 provides plots of the decontamination factors (DF) for strontium (FIG. 17A) and plutonium (FIG. 17B) as a function of contact time for nanosized and micron-sized monosodium titanate. The nanosized materials exhibited removal of strontium and plutonium from the simulated waste solution. The nanosized materials exhibited faster strontium removal than the micron-sized materials and appeared to reach steady state conditions within four hours. The slightly more rapid uptake of $Sr^{2+}$ by nanosized materials compared to the micron-sized likely reflects the higher surface area. However, given the phase ratio used in the experiment, it is not unexpected that the two products exhibited similar removal performance for $Sr^{2+}$ at equilibrium.

Plutonium removal was very similar between the two materials for the first four hours, but at the 24-hour contact time, the nanosized monosodium titanate exhibited a DF of 13.1 compared to a DF of 8.52 for the micron-sized monosodium titanate. In contrast to Sr, which is present as the dication, $Sr^{2+}$, or hydroxyl monocation, $Sr(OH)^+$, plutonium is likely present as anionic hydroxyl complexes such as $Pu(OH)_6(H_2O)^-$ and $Pu(OH)_6^{2-}$. Exchange of the anionic plutonium species would require the release of hydroxyl groups in order for the plutonium to bind to the oxygen atoms of the anionic titania framework. After 24 hours, the nanosized materials removed about 92% and the micron-sized materials removed about 88% of the plutonium. The slightly greater removal of plutonium by the nanosized materials likely reflects the larger surface area. However, ion exchange experiments with longer contact times or single sorbate isotherm experiments would be needed to determine if the inherent ion-exchange capacity of nanosized monosodium titanate for plutonium is greater than that of micron-sized monosodium titanate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming nanosized monosodium titanate comprising:
combining a first solution, a second solution, and a third solution to form a mixture, the first solution including a titanium alkoxide, a sodium alkoxide, and a first alcohol, the second solution including water and a second alcohol, the third solution including a non-ionic surfactant and a third alcohol; and heating the mixture to form the nanosized monosodium titanate as a particulate precipitate.

2. The method of claim 1, wherein the first, second, and third solutions are combined simultaneously.

3. The method of claim 1, wherein the titanium alkoxide is titanium methoxide, titanium ethoxide, titanium isopropoxide, titanium propoxide, titanium butoxide, or mixtures thereof.

4. The method of claim 1, wherein the first solution includes the titanium alkoxide in a concentration of about 800 mmolar or less.

5. The method of claim 1, wherein the sodium alkoxide is sodium methoxide, sodium ethoxide, sodium propoxide, sodium butoxide, or mixtures thereof.

6. The method of claim 1, wherein the first, second and third alcohol are independently isopropyl alcohol, methanol, ethanol, propanol, butanol, isopropanol, or mixtures thereof.

7. The method of claim 1, wherein the first, second and third alcohol are the same as one another.

8. The method of claim 1, wherein the second solution includes the water in a concentration of about 2 molar or less.

9. The method of claim 1, wherein the third solution includes the nonionic surfactant in a concentration of from about 0.01 moles per mole of the titanium alkoxide of the first solution to about 1.2 moles per mole of the titanium alkoxide of the first solution.

10. The method of claim 1, wherein the nonionic surfactant is an aryl alcohol ethoxylate.

11. The method of claim 1, wherein the mixture is heated to a temperature at which a mixture of the first, second and third alcohols and water boils.

12. The method of claim 1, wherein the nanosized monosodium titanate has a maximum particle dimension of about 500 nanometers or less.

13. The method of claim 1, further comprising treating the monosodium titanate with a peroxide.

14. Nanosized monosodium titanate having a maximum cross sectional dimension of about 500 nanometers or less having a monodisperse distribution of particle sizes.

15. The nanosized monosodium titanate of claim 14, wherein the nanosized monosodium titanate has a maximum cross sectional dimension of about 200 nanometers or less.

16. The nanosized monosodium titanate of claim 14, wherein the nanosized monosodium titanate has a BET surface area of about 200 $m^2/g$ or greater.

17. The nanosized monosodium titanate of claim 14, wherein the nanosized monosodium titanate has an isoelectric point of about pH 4 or less.

* * * * *